United States Patent
Kiener

(10) Patent No.: US 11,465,115 B2
(45) Date of Patent: Oct. 11, 2022

(54) REACTOR FOR CARRYING OUT A CHEMICAL BALANCED REACTION

(71) Applicant: Siemens Aktiengesellschaft, Munich (DE)

(72) Inventor: Christoph Kiener, Bayern (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 0 days.

(21) Appl. No.: 17/263,659

(22) PCT Filed: Jul. 15, 2019

(86) PCT No.: PCT/EP2019/069009
§ 371 (c)(1),
(2) Date: Jan. 27, 2021

(87) PCT Pub. No.: WO2020/020689
PCT Pub. Date: Jan. 30, 2020

(65) Prior Publication Data
US 2021/0308645 A1    Oct. 7, 2021

(30) Foreign Application Priority Data

Jul. 27, 2018 (EP) .................... 18186079

(51) Int. Cl.
*B01J 8/00* (2006.01)
*B01J 8/02* (2006.01)
(Continued)

(52) U.S. Cl.
CPC ........... *B01J 8/0292* (2013.01); *B01J 8/0278* (2013.01); *B01J 8/0285* (2013.01); *B33Y 80/00* (2014.12);
(Continued)

(58) Field of Classification Search
CPC ..... B01J 8/00; B01J 8/02; B01J 8/0278; B01J 8/0285; B01J 8/0292; B01J 19/00;
(Continued)

(56) References Cited

U.S. PATENT DOCUMENTS

| | | | |
|---|---|---|---|
| 4,101,287 A | 7/1978 | Sweed | ......................... 23/288 K |
| 5,599,510 A | 2/1997 | Kaminsky | ..................... 422/197 |

(Continued)

FOREIGN PATENT DOCUMENTS

| | | | | |
|---|---|---|---|---|
| CN | 1675147 A | 9/2005 | ............. | B01J 19/00 |
| WO | 2002 063230 | 8/2002 | ............... | F28D 7/16 |

(Continued)

OTHER PUBLICATIONS

Search Report for International Application No. PCT/EP2019/069009, 13 pages, dated Oct. 21, 2019.

(Continued)

*Primary Examiner* — Natasha E Young
(74) *Attorney, Agent, or Firm* — Slayden Grubert Beard PLLC

(57) ABSTRACT

Various embodiments include a reactor for carrying out a chemical equilibrium reaction between two gaseous starting materials and a gaseous product comprising: a pressure vessel including a reaction space with an inlet for the two starting materials and a first outlet for the gaseous product; a catalytic material arranged in the reaction space; a condensation area in the reaction space for the gaseous product; and a cooling duct structure cooling the condensation area. The cooling duct structure and the housing of the pressure vessel are constructed in a single piece. The reaction space includes a reaction duct running in a convoluted or helical (Continued)

manner between partitions within the pressure vessel. A cross section of the reaction duct extends between opposite face sides of the pressure vessel.

15 Claims, 5 Drawing Sheets

(51) Int. Cl.
  *B01J 19/00* (2006.01)
  *B01J 19/24* (2006.01)
  *B33Y 80/00* (2015.01)
(52) U.S. Cl.
  CPC ........... *B01J 2208/00168* (2013.01); *B01J 2208/00884* (2013.01)
(58) Field of Classification Search
  CPC .... B01J 19/24; B01J 19/0248; B01J 19/2485; B01J 2208/00; B01J 2208/00008; B01J 2208/00017; B01J 2208/00106; B01J 2208/00168; B01J 2208/00796; B01J 2208/00884; B01J 2219/00; B01J 2219/00761; B01J 2219/00763; B01J 2219/00765; B01J 2219/00781; B01J 2219/00819; B01J 2219/00844; B01J 2219/24; B01J 2219/2401; B01J 2219/2402

See application file for complete search history.

(56) References Cited

U.S. PATENT DOCUMENTS

| | | | |
|---|---|---|---|
| 2004/0034266 A1 | 2/2004 | Brophy et al. | 585/658 |
| 2008/0193346 A1 | 8/2008 | Vitucci et al. | 422/600 |
| 2014/0200370 A1 | 7/2014 | Bey et al. | 564/420 |
| 2016/0194563 A1 | 7/2016 | Tonkovich | C10G 47/14 |
| 2016/0282052 A1 | 9/2016 | Vernon | 564/71 |
| 2017/0073242 A1* | 3/2017 | Gorval | C01C 1/0447 |

FOREIGN PATENT DOCUMENTS

| | | | |
|---|---|---|---|
| WO | 2009 081175 | 7/2009 | B01J 19/24 |
| WO | 2009/106232 A1 | 9/2009 | B01J 8/02 |
| WO | 2015 077490 | 5/2015 | B22F 3/105 |

OTHER PUBLICATIONS

Extended European Search Report, Application No. 18186079.2, 14 pages, dated Jul. 5, 2019.
Chinese Office Action, Application No. 201980050040.8, 6 pages, dated Mar. 3, 2022.

* cited by examiner

REACTOR FOR CARRYING OUT A CHEMICAL BALANCED REACTION

CROSS-REFERENCE TO RELATED APPLICATIONS

This application is a U.S. National Stage Application of International Application No. PCT/EP2019/069009, now WO 2020/020689, filed Jul. 15, 2019, which designates the United States of America, and claims priority to EP Application No. 18186079.2 filed Jul. 27, 2018, the contents of which are hereby incorporated by reference in their entirety.

TECHNICAL FIELD

The present disclosure relates to chemical reactions. Various embodiments include reactors for carrying out a chemical equilibrium reaction between at least two gaseous starting materials and at least one gaseous product.

BACKGROUND

Catalytically-assisted chemical equilibrium reactions frequently give products whose condensation temperature differs from that of the starting materials (partial-pressure-dependent dew point). An example of such equilibrium reactions is formation of methanol from carbon monoxide and hydrogen or from carbon dioxide and hydrogen, formation of ammonia from hydrogen and nitrogen, formation of dimethyl ether from methanol or from mixtures consisting of carbon monoxide, carbon dioxide and hydrogen, formation of hydrocarbon fuels comprising dimethyl ether or Fischer-Tropsch synthesis from hydrogen and carbon monoxide.

The reactions mentioned are generally exothermic and proceed with volume reduction. The principle of minimization of imposed change (Le Chatelier) dictates that the position of the chemical equilibrium, and therefore the maximum possible concentration of the products, is most favorable for the products when the reaction proceeds at high pressure and low temperature with a high concentration of the starting materials and a low gas-phase concentration of reaction product(s).

One possibility for influencing the reaction in a favorable manner is described in WO 2009/106232 A1. In that document, the reaction space is designed to be able to carry out an equilibrium reaction for the production of methanol. Methanol is condensed during the reaction so that it can be removed from the reaction process. This shifts the reaction equilibrium in a favorable direction. In order to permit condensation to remove the methanol it is necessary to maximize the available condensation area. However, this results in a relatively complex geometrical structure of the reactor used. Production of this reactor is therefore expensive.

SUMMARY

The teachings of the present disclosure describe a reactor which, at a sufficiently high but constant isothermal temperature and at the highest possible reaction pressure, permits synthesis, from gaseous starting materials, of reaction products that are gaseous under these conditions, where the reactor is to be compact and to be amenable to low-cost production. Various embodiments include a reactor for carrying out a chemical equilibrium reaction between at least two gaseous starting materials and at least one gaseous product, comprising a pressure vessel (11) in which is provided a reaction space (12) with an inlet (13) for the starting materials and a first outlet (14) for the products, where arranged in the reaction space (12) is a catalytic material, where provided in the reaction space (12) is a condensation area (23) for the at least one product, where the condensation area is cooled via a cooling duct structure (35, 36), where the cooling duct structure (35, 36) and the housing (15) of the pressure vessel (11) are designed in one piece, where the reaction space (12) is designed as reaction duct which runs in a convoluted or helical manner between partitions (22) within the pressure vessel (11), where the cross section of the reaction duct extends between opposite face sides of the pressure vessel.

In some embodiments, configured in the reaction duct are flow obstacles (31) which, in alternating manner, project from one face side and from the other face side of the pressure vessel (11) into the reaction duct.

In some embodiments, the cooling duct structure (35, 36) runs within the partitions (22).

In some embodiments, the condensation area (23) is configured to be porous.

In some embodiments, the cooling duct structure comprises a first duct system (35) and a second duct system (36) fluidically independent of said first duct system.

In some embodiments, one of the face sides of the pressure vessel (11) is configured as a lid structure (16) or that provided in the pressure vessel (11) there is at least one access aperture closed by a lid structure.

In some embodiments, a bed (21) of catalytic particles, as catalytic material, fills the reaction space (12).

In some embodiments, a preheating duct (25) for the starting materials which forms the inlet runs within an external wall structure (24) of the pressure vessel (11).

In some embodiments, the preheating duct (25) runs in a serpentine manner within the external wall structure (24).

In some embodiments, the preheating duct (25) runs in a plurality of mutually superposed layers (27) within the external wall structure (24).

In some embodiments, the preheating duct (25) runs in respectively mutually intersecting directions in adjacent layers (27).

In some embodiments, this comprises a higher-situated region (32) with the reaction space and a lower-situated region (33), where the second duct system (36) runs through the lower-situated region (33).

In some embodiments, the reaction space (12) comprises at least one output conduit (39) leading into the lower-situated region (32) and, connected to said conduit, at least one return conduit (40) leading into the reaction space, and where these conduits are connected to a second outlet (34).

In some embodiments, a sieve structure (30) separates the reaction space (12) from the at least one output conduit (39) and/or from the at least one return conduit (40).

In some embodiments, an output conduit (39) runs along two adjacent partitions (22), and between the two output conduits (39) the return conduit (40) runs or a plurality of output conduits and input conduits run in alternation.

DETAILED DESCRIPTION

Figure 1:
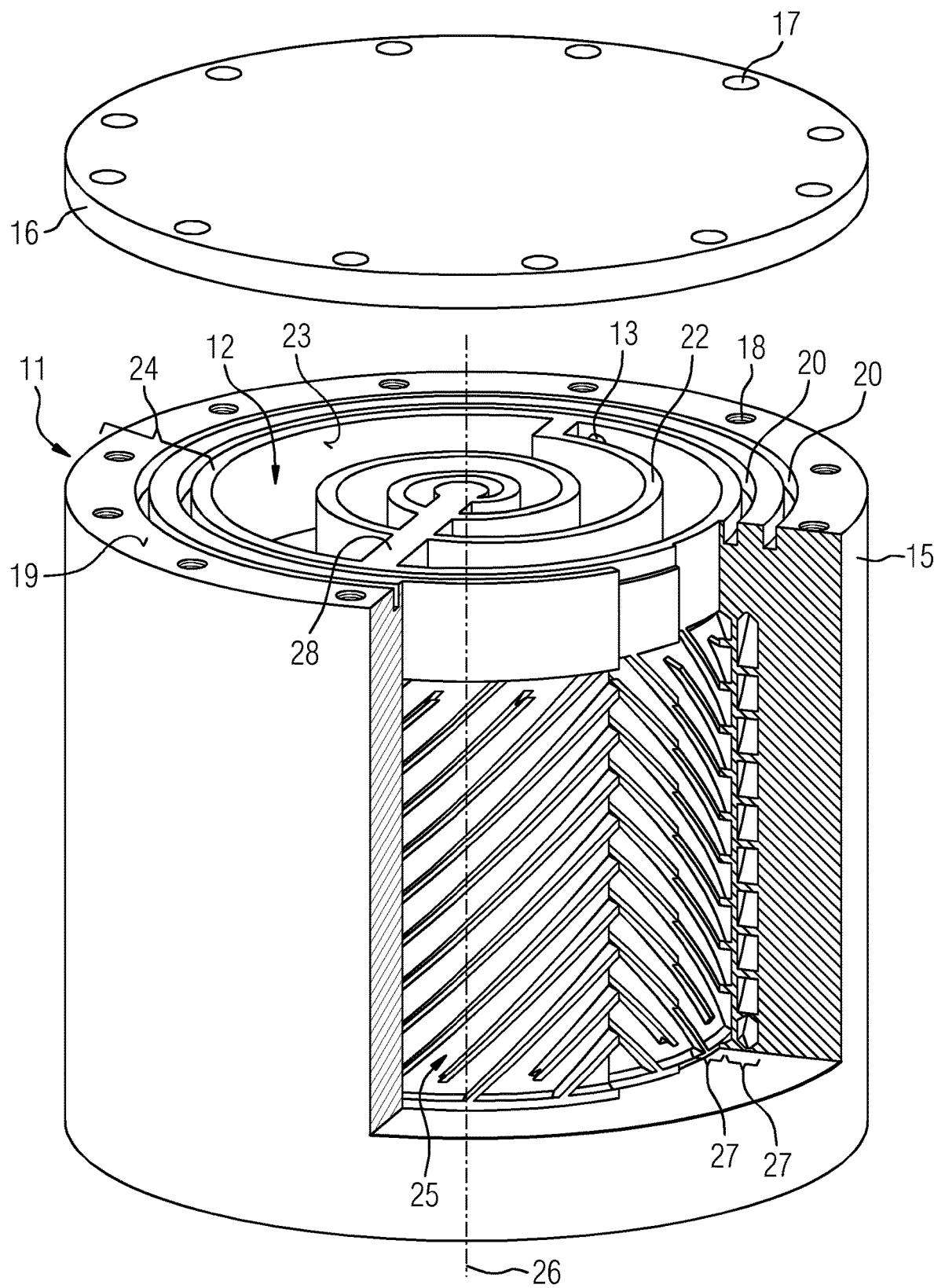
FIG. 1 shows a three-dimensional view of a working example of the reactor incorporating teachings of the present disclosure, depicting only the pressure vessel, partially in cutaway view.

In some embodiments, the duct structure and the housing of a pressure vessel are designed in one piece. In other words, the duct structure and the housing together are one piece or one part. This results in a particularly compact structure of the reactor. Said reactor can be produced in one piece by way of example via an additive manufacturing process such as selective laser melting. The pressure vessel can be designed with a one-part housing, i.e. without an aperture for a lid and correspondingly without need for a lid. The pressure vessel is usefully designed with a lid in order to ensure unproblematic charging of the catalyst particles thereto. Said lid provides a second component, but the housing of the pressure vessel here can be manufactured from one piece. In some embodiments, the catalyst can also be charged via a tubular feed arrangement closed with a screw thread with blind plug as lid.

In some embodiments, a pressure vessel is used in order that the reaction can be carried out at a superatmospheric pressure. As already mentioned, the reaction equilibrium can thus be shifted favorably in the direction of the gaseous products to be produced. "Design in one piece" in this disclosure means that the housing of the pressure vessel, in some cases the entire pressure vessel, is of monolithic design. This means that the one-piece housing part of the pressure vessel cannot be separated into individual parts without destruction of the structure. In some embodiments, the pressure vessel, or its predominant part, is not only designed in one piece but also produced in one piece, i.e. that the "one piece" arises before the end of the production process. In other words, the process technology here forms a solid object from liquid or from particulate solid. Because the reactor is a very geometrically complex object comprising ducts, said production process cannot be achieved via traditional processes such as casting. In some embodiments, there is a process for the additive production of the structure.

Some example additive manufacturing processes are those in which the material from which a component is to be produced is added to the component during production. The component produced here already has its final shape or at least approximately that shape. The construction material can by way of example be pulverulent or liquid, and the material for the production of the component here is chemically or physically hardened via the additive manufacturing process.

In order to permit production of the component, data describing the component (CAD model) for the selected additive manufacturing process are prepared. In order to generate instructions for the manufacturing plant, the data are converted into data appropriate for the process of manufacturing of a workpiece to be produced, so that the appropriate process steps for the successive production of this workpiece can proceed in the manufacturing plant. The data used for this purpose are processed to provide the geometric data for the respective workpiece layers that are to be produced, for which the term slices is also used. The workpiece can also have a shape deviating from that of the component. By way of example, it is possible to make allowances for component distortion which is caused by the production process and which is compensated via deviations in workpiece geometry. The workpiece also usually comprises supportive structures which must in turn be removed during subsequent operations on the component.

The following are examples of additive manufacturing: selective laser sintering (or SLS), selective laser melting (or SLM), electron beam melting (or EBM), laser metal deposition (or LMD), and metal sintering processes (hardening, binder removal and sintering, or BJ for binder jetting). These processes are in particular suitable for the processing of metallic materials in the form of powders which can be used to produce construction components.

In the case of SLM, SLS, EBM and BJ, the components are produced layer-by-layer in a powder bed. These processes are therefore also termed powder-bed-based additive manufacturing processes. In some embodiments, a layer of the powder is produced in the powder bed and is bonded to previously hardened regions of the component. This is achieved via an energy source (laser or electron beam), where local melting or sintering is carried out in those regions in which the component is to be produced, or the component is produced via hardening of powder particles by precise local application of adhesive or binder. The component is thus produced successively layer-by-layer, and can be removed from the powder bed after manufacture.

In the case of LMD, the powder particles are supplied directly to the surface on which material is to be applied. The powder particles in LMD are melted by a laser directly at the point of impact on the surface, and thus form a layer of the component which is to be produced.

A feature of SLS is that in these processes the powder particles are not completely melted. Care is taken in selection of the sinter temperature in SLS to ensure that this is below the melting point of the powder particles. In contrast, in the case of SLM, EBM and LMD the quantity of energy introduced is high enough to achieve complete melting of the powder particles.

A feature of BJ is that initially the bonding between the powder particles has only low strength. The resultant three-dimensional object must be cleaned to remove loose powder, and thus be hardened in a thermal binder-removal and sintering process.

In some embodiments, a reactor can be produced by a process which achieves the abovementioned object. The process produces the reactor for carrying out a chemical equilibrium reaction between at least two gaseous starting materials and at least one gaseous product by producing the pressure vessel in one piece. An additive manufacturing process may be used here. The reaction space is produced here with a condensation area for the at least one product. A cooling chamber structure which can cool the condensation area is moreover produced. The reactor comprises a pressure vessel of which at least the predominant part, e.g. a one-piece housing with or without an aperture for a lid, is produced by the additive manufacturing process. The pressure vessel forms a reaction space, produced with an inlet for the starting materials and with a first outlet for the products.

The reactor thus designed has the advantages stated above. In a further production step it is possible to charge a catalytic material to the reaction space. If the reaction space has been produced only to a predominant extent by the additive manufacturing process, and therefore a relatively large aperture has been formed for the charging of the catalyst material, this aperture can then be closed with a suitable lid.

In some embodiments, the catalyst in the reaction space can be a bed. This bed consists of particles with a diameter of about one millimeter. The material of the catalyst must be selected in a manner suitable for the chemical equilibrium reaction that is to be carried out. The catalysts suitable for the equilibrium reactions that are to be carried out are known and can therefore be selected in relation to a particular use. The cooling chamber structure may be integrated into the walls of the reaction space. That is where in all cases the equilibrium reaction takes place. Condensation of the reaction products, so that these can be discharged from the reactor, can therefore take place before they leave the location of production of same. This shifts the reaction equilibrium, thus permitting production of more of the reaction product from the starting materials of the reaction. The condensation area is suitably connected to a first exit, so that the condensate can be discharged from the reactor through the exit. The first exit may be provided at a geodetically low-situated point of the reactor, since gravity causes the condensate to flow downward, and it requires no assistance for discharge from the reactor at that location. This discharge is moreover promoted by superatmospheric pressure prevailing in the reaction space.

In some embodiments, there is a reactor of comparatively small size with compact structure. Unlike in the case of reactors assembled from a large number of individual components, production in one piece, in particular by an additive manufacturing process, is also cost-effective for production of compact reactors of small size. Such reactors can, in particular when the equilibrium reaction carried out involves hydrogen, be used to support what are known as power-to-X applications. These are applications that utilize excess electrical energy from generation of energy from renewable sources, in order to produce valuable reaction products in a circular economy with minimal use of fossil feedstocks.

Small reactors are capable of rapid heating and cooling, and are also amenable to discontinuous operation, insofar as a stable non-operating condition is maintained between the operating phases. Small power-to-X systems of this type could therefore also be decentralized and are, therefore, attractive for using a flexible mode of operation to react to variations within the energy-supply grid. The excess electrical power can then be diverted for production and storage of high-value storable and transportable chemicals, thus permitting use thereof without $CO_2$ emissions. Various equilibrium reactions indeed bind $CO_2$ from the atmosphere, thus actually providing a positive $CO_2$ balance.

Interest in smaller plants also exists in the chemical industry. With these, there is no longer any need to produce chemical products at a central location in a large plant, and it is therefore possible to reduce capital expenditure risk. There is moreover no need for relatively long transport distances, which in the case of chemicals are associated with increased costs due to safety standards. A flexible response to increased demand can be achieved by installing a large number of the smaller plants. Because these have low production costs, the capital expenditures can be distributed across a relatively long period of time, without exceeding those for acquisition of a large plant.

The use of small plants incurs less cost for pressure-tight production. Reactors that are more compact can be designed more easily to resist the pressure that arises. In particular when the duct structures running within the interior of the reactor are monolithic, it is possible to use these ducts for additional stabilization of the entire reactor. The quantity of material required for pressure-tight production of the pressure vessel is therefore comparatively small.

In some embodiments, the reaction space a reaction duct which runs in a convoluted or helical manner between partitions within the pressure vessel. The cross section of the reaction duct here extends between opposite face sides. In other words, the shape of the reaction space is designed so that it has two opposite face sides connected to one another via a jacket. The cross section of the reaction duct therefore runs from face side to face side by way of the entire height of the reaction space. It is possible here either that the reaction duct runs in a helical manner or by way of example that it runs in a serpentine manner within the reaction space.

It is thus ensured that the reaction gases (i.e. the starting materials and products) are forcibly guided through the reaction space. The reaction duct moreover provides areas of sufficient size for the condensation of the products. The helical or convoluted course of the reaction duct moreover allows the structure of the reactor to be exceptionally compact. Production in particular by additive manufacture permits easy production of the complex geometric structures arising by virtue of the convoluted or helical course of the reaction duct. On the other hand, a compact structure is advantageous in the case of additive manufacturing because said structure optimizes utilization of the restricted size of the additive manufacturing plants. In the case of a helical course of the reaction duct, production of the reaction space in a cylindrical shape is particularly advantageous. If the reaction duct is convoluted, a particularly useful shape of the reaction space may be a rectangular parallelepiped.

In some embodiments, configured in the reaction duct are flow obstacles which, in an alternating manner, project from one face side and from the other face side of the pressure vessel into the reaction duct. The flow obstacles, which may be configured by walls, permit the reaction gases to be further forcibly guided. These can then be guided within the reaction duct. It is possible, by way of example, for the flow obstacles to project, in an alternating manner, from one face side and from the other face side into the reaction duct. By virtue of these, the reaction gases must flow back and forth in alternation between one of the face sides and the other face side. The flow obstacles can also be cooled in order to provide additional condensation areas.

In some embodiments, the cooling duct structure runs within the partitions. By virtue of the design of the structure, the partitions intrinsically provide a large part of the duct-shaped surface surrounding the reaction space. If these are utilized to collect the reaction product condensate on said surface, they serve a twin function. The cooling of the partitions can provide uniform dissipation of heat. This is necessary in order that the temperature level in the reactor can be kept constant during the course of an exothermic reaction.

In some embodiments, the condensation area can be configured to be porous. Capillary ducts are thus produced which assist condensation. By way of example, a porous metal can cover the cooled wall of the helical or convoluted reaction duct on the area facing toward the reaction duct. The technology of the reaction permits achievement of a high concentration, or a high partial pressure, of the reaction product, because operations are carried out at the lowest possible temperature and at high pressure. The reaction gas then comes into contact with the metallic capillary structure of the isothermal cooling walls consisting of the capillary structure. Because the dew point has been reached here, the reaction product condenses on the colder porous metal. The chemical equilibrium of the reaction is thus shifted, and further reaction product is produced, with the advantage of better yield. The capillaries in the porous metal can be ducts with duct diameters in the range of 10 to 1000 µm, 30 to 400 µm, and/or 50 to 250 µm. The capillaries assist condensation by virtue of the small distances to the walls. Good thermal conduction takes place here in the wall, the heat here being dissipated via a first coolant within the interior of the wall.

The porosity can be configured to be amenable to production via a suitable photoirradiation strategy, for example by means of selective laser melting (SLM) or selective laser sintering (SLS). The pores here can be obtained via a defined photoirradiation strategy. On the one hand it is possible to produce the porosity via SLS, i.e. by introducing, across the entire surface, a quantity of energy that is smaller in comparison with SLM. The powder particles here become sintered to one another, while interstices remain between the powder particles. On the other hand, if the interstices arising between the powder particles during SLS do not generate sufficient porosity, it is also possible to select a photoirradiation strategy in which the surface of the powder bed is only partially photoirradiated by SLM, so that individual powder particles avoid photoirradiation and can subsequently be removed from the workpiece.

Pore formation can be generated by randomly distributed incomplete photoirradiation of the powder bed, where the profile of the pores, or of the photoirradiated region of the respective powder layers, is random. In some embodiments, the incomplete photoirradiation regime complies with defined patterns, for example a distance between photoirradiation lines which is intentionally selected to be sufficiently large that, between the traces, there are remaining particles which have not been photoirradiated and which have not been melted, or have not been incipiently melted. Within these regions, the desired pores are produced. This is achieved by way of example in that, during the production process, the parallel traces are rotated by, for example, 90° at regular intervals. This change takes place after completion of a defined number of powder layers, as required by the desired pore size.

In some embodiments, the cooling duct structure comprises a first duct system and a second duct system fluidically independent of said first duct system. It is thus possible to use two different coolants with different temperature levels. One of the coolants flows through the first duct system, while the other coolant flows through the second duct system. It is thus possible to achieve better control of the chemical equilibrium reaction, as also explained in more detail below.

It is thus possible to discharge the condensed product through a conduit at a geodetically low-lying point of the reaction space. In some embodiments, the reaction space comprises at least one output conduit leading into a lower-situated region and, connected to said conduit, at least one return conduit leading into the reaction space. These conduits are then connected to a second outlet. The advantage is that different temperature levels can thus arise in the reactor region. The reactor can therefore by way of example comprise a higher-situated region with the reaction space and a lower-situated region, where the second duct system runs through the lower-situated region.

"Geodetic" here is to be understood as referring to a geodetic position (taking account of the direction of action of gravity). As already described, the first duct system is provided for the cooling of the reaction space and, respectively, of the reaction duct. However, a second lower-situated region is required if the intention is to achieve supercooling of the, still pressurized, liquid reaction products. The supercooled liquid reaction product can be discharged in a controlled manner from the pressurized space by way of a control valve. Because of the volume reduction associated with the reaction stoichiometry and the condensation of the reaction product during the reaction, further fresh gas with the starting materials for the reaction flows from outside into the reactor. The fresh gas here also flows past the catalyst, thus continuing the reaction.

In some embodiments, one of the face sides of the pressure vessel is configured as a lid structure, or that provided in the pressure vessel (11) there is at least one access aperture closed by a lid structure. In comparison with the remainder of the housing, the lid structure is smaller, i.e. produced with a smaller mass, and can consist of a material deviating from that of the remainder of the housing structure. In some embodiments, the lid can be produced by any desired manufacturing process, for example casting processes or machining production processes, but another possibility is production by an additive manufacturing process, by the process that can also be used to produce the remainder of the housing structure that forms the reaction space.

The predominant part of the pressure vessel that is formed by the housing structure is therefore designed in one piece, while the lid forms a separate component. The lid provides an aperture through which a catalyst can be charged to the reaction space. It is moreover also possible that, at no great cost, powder (from a powder bed which by way of example serves for the production of the component during SLM) remaining in the reaction space during an additive production process is removed from the reaction space before the catalyst is charged to the reaction space. If the charging aperture for the catalyst is of tubular design, the lid can also be designed as a screw-threaded tube with blind plug. In the case of separated reaction spaces, a charging aperture can be provided for each reaction space.

The catalyst must be selected as required by the reaction that is to be carried out. Known catalyst materials are to be selected for this purpose, as required by a particular usage. The catalyst consists of a bed of particles which can be formed by a granulate or cylindrical extrudate, or else by spherical beads. The average particle size of the particles is preferably one millimeter. Once the particles have filled the reaction space, the reactor is, as described above, closed, e.g. by way of a conventional flange, with the lid that may be of pressure-tight design. In order to form a seal, the pressure-tight lid moreover has a gasket which lies flat on the walls of the remainder of the housing of the pressure vessel and thus can provide a gastight connection. The reaction fluid is thus forced to take the intended path through the catalyst bed. In the embodiment with tubular feed arrangements, catalyst particles completely fill the catalyst space, and the screw-threaded tube is closed in a pressure-tight manner.

The external dimensions of the reactor can be between 100 mm and 1000 mm, between 200 and 600 mm, and/or between 250 mm and 400 mm (the external dimensions being provided by way of example by the diameter in the case of cylindrical underlying shape). The height can be between 80 mm and 800 mm, between 180 mm and 500 mm, and/or between 250 mm and 400 mm. In order to generate the ability to withstand pressure, the outermost wall of the reactor can be designed with a relatively high wall thickness and, because of conducting the fluid, in particular in the case of a helical course of the reaction duct, is colder than the remainder of the reactor; this has the advantage that the cooler material has greater mechanical strength and can therefore withstand a higher pressure.

In some embodiments, a preheating duct for the starting materials, which forms the inlet for said starting materials, runs within said external wall structure of the pressure vessel, i.e. in the exterior wall, which must also ensure the capability of the pressure vessel to withstand pressure. The starting materials must therefore be conducted through the preheating duct before they reach the reaction space. Preheating of the starting materials can take place here, and at the same time it is also possible here for the external wall to be cooled.

It is thus possible to influence locally the temperature gradient in the reactor, thus on the one hand ensuring provision of the reaction temperature of the reaction proceeding in the reactor and on the other hand ensuring the mechanical strength of the external wall structure. The preheating duct has a serpentine course within the external wall structure. A comparatively long preheating duct is thus formed, and the length of fluid-flow through same is therefore sufficient to reduce the temperature of the external wall structure and to heat said fluid. The wall thickness of the walls between the adjacent loops of the preheating duct can be from 0.5 mm to 2 mm. Duct widths of the duct can be between 1 mm and 10 mm, and its duct height can be from 1 mm to 8 mm. The duct height is measured perpendicularly to the course of the external wall structure, while the duct width is measured parallel to the course of the wall of the external wall structure.

In some embodiments, the preheating duct runs in a plurality of mutually superposed layers in the external wall structure. The length of the preheating duct can thus be even greater, thus permitting even more heating of the reaction fluid, i.e. the starting materials. In some embodiments, the preheating duct first runs through the externally situated layers in the wall structure and then runs through the internally situated layers in the wall structure (or in the case of two layers first runs through the exterior layer and then runs through the interior layer in the wall structure). This assists the cooling of the external wall structure, which then is cooler externally than internally. The cool starting material therefore first flows through the outside layer in the external wall structure, where it is already heated to some extent, and then flows through the inner layer of the external wall structure where, because of the higher temperature level, further heat exchange with the external wall structure is possible (parallel-flow principle of a heat exchanger).

If the preheating duct is designed in adjacent layers, the preheating duct runs in respectively mutually intersecting directions in adjacent layers. In each layer there is then a preferential direction in which the ducts run parallel. This can be arranged at an angle to the longitudinal extent of the reactor (i.e. in particular at an angle to a longitudinal axis of the reactor), so that the ribs located between the parallel ducts intersect in adjacent layers. Mechanical stabilization of the external wall structure is thus achieved, because grid-like reinforcing structures are formed within the external wall structure at the points of intersection of the intervening walls.

It is thus possible to realize high resistance to pressure at the same time as low materials cost and low heat loss. The resultant complex geometric structures can preferably be produced by an additive production process at no great cost. If the ducts are slanted in relation to the longitudinal extent (i.e. in the case of a cylindrical configuration of the pressure vessel slanted in relation to the axis of the cylinder), overlaying of these gives, if the course of the preheating duct is parallel, a diamond pattern. If the slant angle is 45°, which is particularly advantageous, the resultant pattern is rectangular, in particular a pattern consisting of squares.

The helical course of the duct structure can by way of example be defined by a curve of the radius:

$$r = a \cdot t$$

where
a>0 and
t≥0 (definition of a helix with realization of a constant duct width)
or $$r^2 = a \cdot \varphi$$

where
a>0 and $\varphi \geq 0$ (for a duct width that increases toward the interior of the helix, with a resultant decrease of the flow velocity toward the interior of the cylindrical reaction space).

In some embodiments, the reactor comprises a higher-situated region with the reaction space and a lower-situated region, where the second duct system runs through the lower-situated region. The reactor can thus be divided into zones of different temperature levels. For the purposes of the disclosure, higher- and lower-situated mean geodetically higher-situated and geodetically lower-situated. Gravity therefore causes cooler reaction fluid and, respectively, a condensate to flow into the lower-situated region.

It is thus possible to subject the reaction product (liquid or gaseous) in the second duct system to supercooling. Specifically, the reaction product which is cooled in the first duct system continues to be under pressure, and indeed under the particular pressure that prevails in the reaction space in order to support the equilibrium reaction. In order to be able to remove the reaction product from the reactor at atmospheric pressure without evaporation of said product it is therefore necessary to supercool same beforehand. In terms of reaction technology, this is a measure which can advantageously be implemented in an integral part of the reactor, specifically in the lower-situated region. The reactor therefore allows further integration of a function that can be integrated into one and the same component. A particularly compact design can thus be achieved.

In some embodiments, the reaction space is also separated by a sieve structure from the at least one output conduit and/or from the at least one return conduit. It is thus possible, even in a complex design, to prevent the catalyst-particle bed from passing into the output conduit or the return conduit during flow of the reaction fluid. The sieve structures therefore contribute to the formation of a defined reaction space in which the catalyst-particle bed can be dependently retained.

In some embodiments, the reaction space has at least one output conduit leading into the lower-situated region and, connected to said conduit, at least one return conduit leading into the reaction space, and where these conduits are connected to a second outlet.

The second outlet therefore conducts the reaction fluid back into the reaction space after passage through the lower-situated region. The reaction space can accommodate one or more of such structures. There is advantageous possibility that, in the lower-situated region, the reaction product is separated by this means from the reaction fluid, in particular by condensation, and that the reaction equilibrium is thus favorably shifted in a manner such that more of the starting materials for the reaction are converted to the reaction products.

In some embodiments, an output conduit runs along two adjacent partitions, and between the two output conduits the return conduit runs or a plurality of output conduits and input conduits run in parallel with one another in alternation. In this design it is possible that the output conduits already experience cooling of the fluid by way of the partitions before the reaction fluid is discharged into the lower-situated region.

Between the two output conduits running on the partitions there is at least one return conduit or an uneven number of return conduits and an even number of output conduits. The even number of output conduits is then smaller by 1 than the uneven number of return conduits, these being arranged in alternation. A counterflow heat exchanger is realized here via the alternating arrangement of output conduits and return conduits, by virtue of the duct system thus formed. In other words, the reaction fluid conducted through the output conduits can be cooled by heating the reaction fluid flowing through the return conduits (i.e. heat exchange takes place). The reaction fluid is thus cooled before it passes into the lower-situated region, and then reheated before it passes into the reaction space. A favorable energy balance is thus realized for the reactor.

Two reactions that can be carried out by an example reactor as described herein may be mentioned by way of example. One of the reactions relates to the production of methanol from hydrogen and carbon dioxide (feedstock). A reaction mixture made of the feedstock material and methanol is then produced in the reactor, and in a first step here water can be separated as condensate 1 in order to achieve a favorable shift of the reaction equilibrium. Methanol, the concentration of which is advantageously already high in the reaction product, is then separated as condensate 2 (separated in the lower-situated region). Suitable coolant 1 and coolant 2 are used for this purpose. The reaction is presented in more detail in the table below.

| Reaction step | Pressure | Temperature | Reaction equation |
| --- | --- | --- | --- |
| Feedstock | 150 bar | 25° C. | $3H_2 + CO_2$ |
| Reaction mixture | 150 bar | 220° C. | $3H_2 + CO_2 + CH_3OH + H_2O$ |
| Coolant 1 | 1 bar | 200° C. in 220° C. out | e.g. Marlotherm N high-temperature fluid |
| Condensate 1 | 150 bar | About 220° C. (equilibrium partial pressure about 24 bar corresponds to dew point about 222° C.) | $H_2O$ [very small quantity of $CO_2$, $CH_3OH$ dissolved] |
| Coolant 2 | 1 bar | 15° C. in 30° C. out | $H_2O$ cooling water, mains water |
| Condensate 2 | 100 bar | e.g. 40° C. (equilibrium partial pressure about 24 bar corresponds to dew point about 175° C.) | $CH_3OH$ [+$H_2O$ + small quantity of $CO_2$] |

Another reaction is the production of ammonia from nitrogen and hydrogen. These are admixed as feedstock, and the reaction mixture here also comprises ammonia. The two-stage condensation by way of a coolant 1, a coolant 2 and a coolant 3, produces ammonia, which is present in a comparatively high concentration in the reaction product. The reaction is presented in the table below.

| Reaction step | Pressure | Temperature | Reaction equation |
| --- | --- | --- | --- |
| Feedstock | 250 bar | 50° C. | $3H_2 + N_2$ |
| Reaction mixture | 250 bar | 500° C. | $3H_2 + N_2 + NH_3$ |
| Coolant 1 | 10 bar | 350° C. out | Naphthalene heat pipe + Marlotherm |
| Coolant 2 | 1 bar | 60° C. in 110° C. out | Marlotherm |
| Condensate | 250 bar | 90° C. (equilibrium partial pressure $NH_3$ about 130 bar corresponds to dew point 113° C.) | $NH_3$ (l) [very little $H_2$ + very little $N_2$] |
| Coolant 3 | 1 bar | 15° C. in 30° C. out | $H_2O$ cooling water, mains water |
| Supercooled condensate | 250 bar | 25° C. | $NH_3$ (l) [very little $N_2$, $H_2$] |

In some embodiments, the reactor designs described in the present disclosure for carrying out equilibrium reactions with gaseous starting materials and with gaseous products that can be condensed at relatively high temperatures provide some or all of the advantages listed below:

1. Realization, via additive manufacturing, of process integration of these following functions and concept in A SINGLE monolithic component (possibly with additional lid).
    a. condensing reactor, thus permitting, via selective condensation of the products, separation of substances before they leave the reactor, and to this end
        i. chemical equilibrium maximally shifted to the product side so that dew point is reached
            1. lowest possible temperature (exothermic reaction)
            2. high pressure (volume reduction during reaction)
            3. continuous further formation enabled via constant withdrawal of heat (from exothermic reaction) and of reaction products
        ii. heat dissipation at relatively high temperature level just sufficient to permit condensation of the products, and therefore
        iii. continuous withdrawal of the products in the reactor on a cooled structure (e.g. wall)
            1. assisted by capillary condensation in porous metallic layer on the wall
            2. in the case of product mixtures, utilization of the different dew points and selective condensation in the reactor via creation of different temperature zones:
                a. component 1 (condensing at lower temperature) is withdrawn at all points on the wall of the helix of the reaction space
                b. component 2 is condensed when the reaction gas is transported downward into a lower-situated region of the reactor that is cooled to a lower temperature, and the condensable products are substantially condensed
                c. downward/upward transport of the reaction gas in the manner of a feed-effluent exchanger consisting of the output conduits and the return conduits d. repetition of this condensation several times in succession, so that almost all of the quantity of gas introduced is consumed by reaction (in the manner of a "cooled tray reactor" with product withdrawal).

iv. Utilization of the heat output in the cooling system at highest possible temperature level (valuable heat for the purposes of good energy utilization).

v. Construction of the reactor with exterior preheating zones so that, despite small size, no heat is lost.

vi. Utilization of additive manufacturing with high wall thicknesses in the external region for high pressure resistance, and with complex duct systems in the wall structure.

vii. Design appropriate for the reaction, for example, in the interior, design of the reaction zone that conducts the gas helically inward and in the partitions conducts the condensation cooling, and at the walls conducts the condensate away into the lower region of the reactor.

viii. Only very little tailgas extract in the center, in order to initiate/control the reaction and to extract inert gases; (the gases automatically "slip" onward because volume contraction occurs, caused by the reaction and by condensation). This is almost a "dead-end reactor" with no requirement for circulation of the gas.

b. Isothermal reactor maximizes product specificity, because hot spots are avoided and identical reaction conditions are present throughout the reactor.

2. Simplification of the design in the entire system, because much pipework and many components and process units are omitted (distillation, recompression, coolers, phase separators, etc. everything is already monolithically integrated within the reactor by means of additive manufacturing).

3. Discontinuous operation possible because of continuing possibility for rapid heating and, respectively, control to reaction temperature via the temperature-control medium, and therefore for immediate start of the reaction, and also control of mass flow rates of temperature-control medium, mass flow rate of gaseous starting material, composition of gaseous starting material, reaction pressure and mass flow rates of product withdrawal in a manner such that the catalyst can be "parked" in an active non-operating condition during pauses, with the aim of subsequent immediate restart.

4. Simple control of the reaction by way of the temperatures of the temperature-control media and the pressure of the reaction system. Fully automatable as decentralized container-size solution.

Further details of the teachings herein are described below with reference to the drawing. Identical or corresponding elements in the drawings respectively have the same reference sign, and explanations of these are repeated only insofar as there are differences between the individual figures.

The working examples explained below are example embodiments of the teachings herein. The components described of the embodiments in the working examples respectively represent features of the disclosure that are individual and are to be regarded as independent of one another, and respectively also independently of one another provide further development of the teachings herein and therefore also are to be regarded, individually or in a combination other than the combination shown, as constituent of the disclosure. The embodiments described can moreover also be supplemented by other features from the features of the invention described above.

FIG. 1 depicts an example pressure vessel 11 for a reactor incorporating teachings of the present disclosure. This has a cylindrical underlying shape. Configured in the pressure vessel 11 is a helical duct which forms a reaction space 12. The reaction space 12 moreover has an inlet 13, and also a first outlet not depicted in any further detail (cf. reference sign 14 in FIG. 3).

The largest part of the pressure vessel 11 has been produced in one piece. This largest part consists specifically of a housing 15, which can be closed by a lid 16. Provided in the lid 16 there are holes 17, and provided in the housing 15 there are threaded holes 18, so that bolts or threaded rods and nuts not depicted can be used to assemble the lid on the housing. The housing 15 here forms a flange 19, which also has grooves 20 for sealing rings not depicted, so that a dependable seal can be achieved between housing 15 and lid 16. There could also be another seal present in the helix loops, this likewise not being depicted. Prior to the assembly of the lid 16, a bed (cf. FIG. 2, reference sign 21) made of catalyst particles can be charged to the reaction space 12.

In some embodiments, the housing 15 has a complex structure which can be produced in one piece by an additive process, e.g. laser melting. The open-top design of the housing 15 permits easy removal of residual powder in the reaction space 12 before the bed 21 is charged to the reaction space. A partition 22 divides the reaction space 12 in a manner such that said space runs helically inward, while the shape of the entire reaction space is cylindrical. The cross section of the annular reaction duct extends respectively from the basal area, not depicted, to the open-top lid area, which is closed by the lid 16. Configured in the helical reaction duct thus formed are moreover condensation traps 28 whose function is explained in more detail below (cf. FIGS. 5 and 6). The reaction fluid flows through these during its helical flow from the inlet 13 inward to the outlet 14 (cf. FIG. 2).

A pressure-tight external wall structure 24 surrounds the reaction space 12. The wall thickness allows build-up of a pressure of, for example, 100 bar in the reaction space 12. Provided for the reaction fluid in the external wall structure 24 moreover is a preheating duct 25 which runs from an exterior inlet, not depicted, to the inlet 13 of the reaction space. The preheating duct 25 has a serpentine course, i.e. the preheating duct runs upward and in turn downward in constant alternation. The course of the resultant loops is inclined at 45° to a central axis 26 of the reactor. The preheating duct 25 is moreover arranged in two layers 27 mutually superposed in a radial direction, where the inclination of the individual loops of the preheating duct 25 in the two layers is rotated by 90°. The result of this, in plan view, is an intersecting pattern of the walls present between the loops; ideal reinforcement of the external wall structure 24 is thus achieved.

Figure 2:
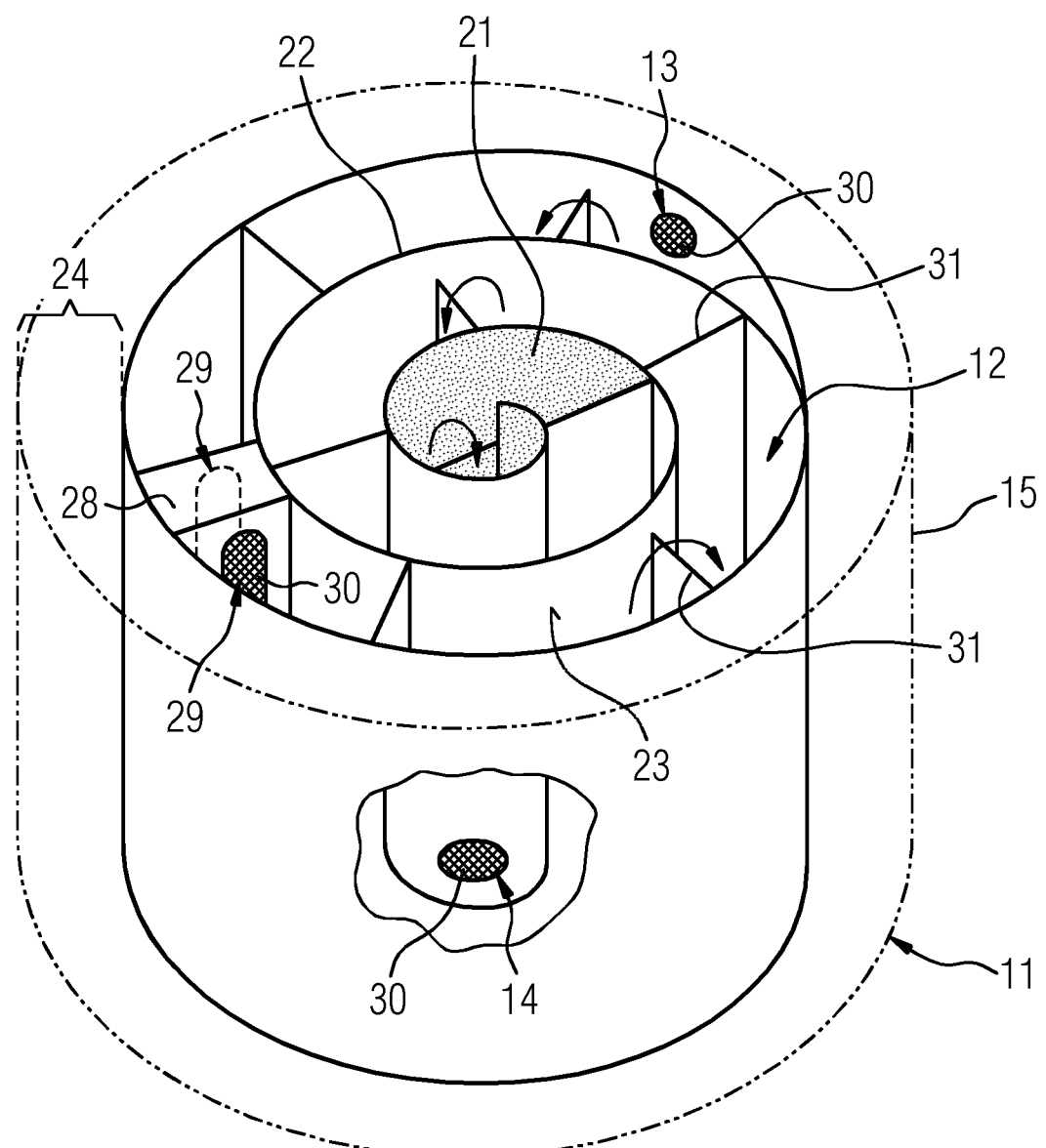
FIG. 2 shows a diagrammatic three-dimensional view of another working example of the pressure vessel incorporating teachings of the present disclosure.

FIG. 2 provides a diagrammatic depiction of a pressure vessel 11 incorporating teachings of the present disclosure which, like the pressure vessel in FIG. 1, comprises a helical reaction duct. It can additionally be seen that the inlet 13 and the outlet 14, and also passages 29 for the reaction fluid at the condensation trap 28, have sieve structures 30 in order that the bed 21 can be dependably retained in the reaction space 12. Attached in the reaction duct are moreover flow obstacles 31 which form chicanes for the flowing reaction fluid, thus forcibly guiding the fluid through the reaction space 12. As can be seen from FIG. 2, half of the flow obstacles do not extend as far as the lid, not depicted in FIG. 2. The other half of the flow obstacles have openings in the basal region, not depicted, of the housing 15 so that the reaction fluid can flow around the flow obstacles there. As indicated by the arrows, the reaction fluid therefore follows a serpentine top-to-bottom course.

In the interests of clarity, the bed is depicted only in the interior region of the reaction space 12. It is self-evident that in reality the bed 21 fills the entire reaction space. The first outlet 14 can be seen only because the housing is depicted with a partial cutaway. In the cutaway part it is possible to see the innermost part of the helix formed by the partition 22. The first outlet 14 is arranged at the base of this innermost structure.

Figure 3:
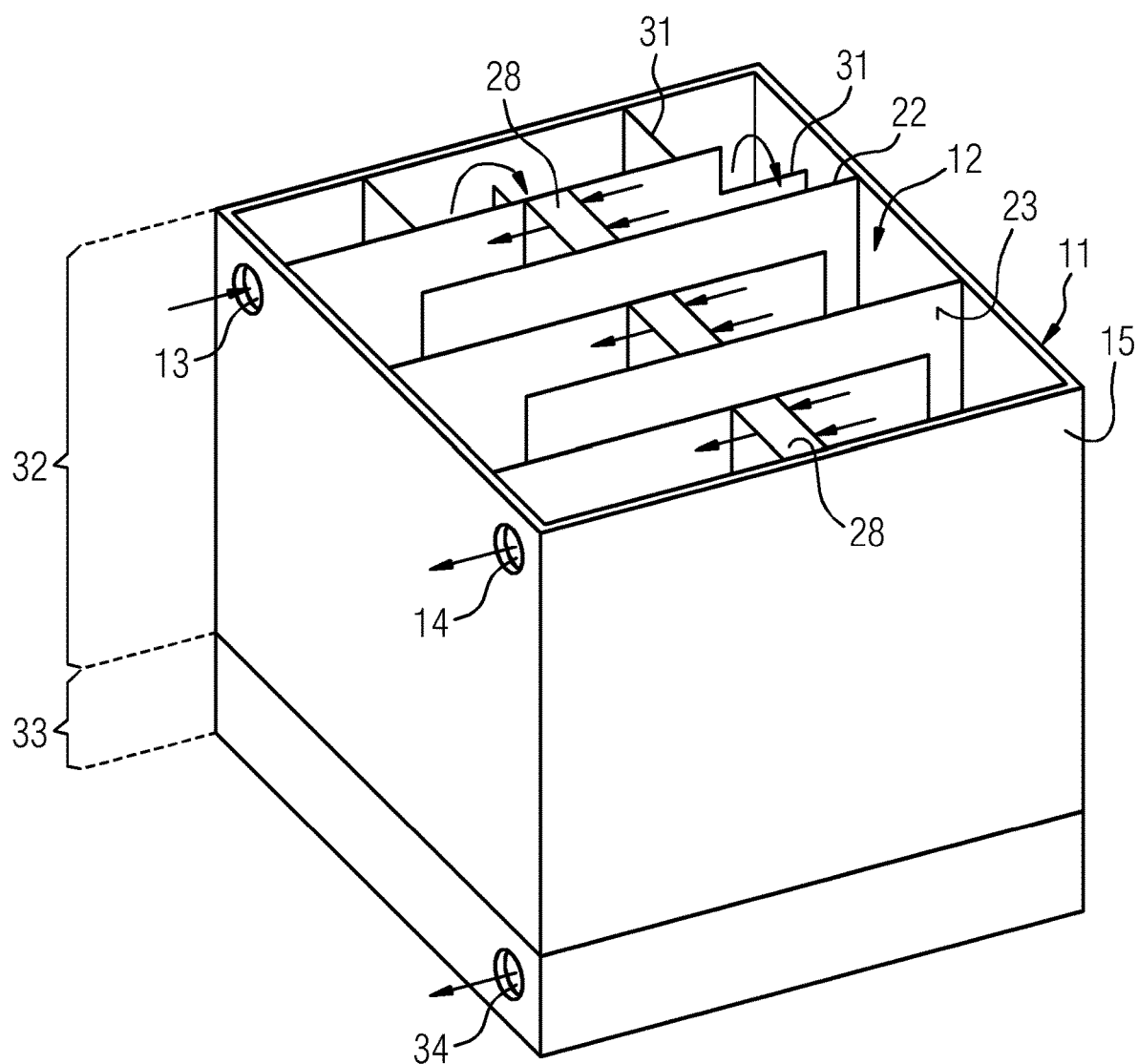
FIG. 3 shows a three-dimensional view of a further working example of the pressure vessel incorporating teachings of the present disclosure for the reactor.

FIG. 3 shows an alternative course of the reaction duct configured via the partitions 22 in the reaction space 12. The entire reaction space 12 has the shape of a rectangular parallelepiped, where the partitions 22 run in straight lines. The resultant course of the reaction duct is therefore convoluted. Provided in said duct there can also be, as indicated in the first part of the reaction duct, flow obstacles 31. Condensation traps arranged at regular intervals in the condensation duct can moreover be seen.

It can likewise be seen in FIG. 3 that the pressure vessel 11 is divided into a higher region 32 and a lower region 33. These regions are at a different temperature level, as is explained in more detail in FIG. 4. It is thus possible to cool a reaction product in the lower region 33 in order to remove this from the pressure vessel 11 by way of a second outlet 34. In particular, supercooling of the pressurized reaction product, in particular of the condensate, can take place in the lower-situated region 33, in order that said product can be discharged from the pressure vessel 11 through the second outlet 34 without boiling again.

In FIGS. 2 and 3, the respective housing structures that form the pressure vessel 11 have a lid 16 and an associated aperture. Because production of the pressure vessel 11 by additive production processes allows great design freedom, it is also possible to conceive of a design which does not have a single aperture closed by a lid 16.

In some embodiments, there is a plurality of tubular connecting elements (not depicted in FIGS. 2 and 3), where these preparatory stages serve for the charging of the particles to the internal structures of the pressure vessel 11. Lid structures can then be used to provide these tubular connecting elements with correct hermetic sealing from the external environment.

Figure 4:
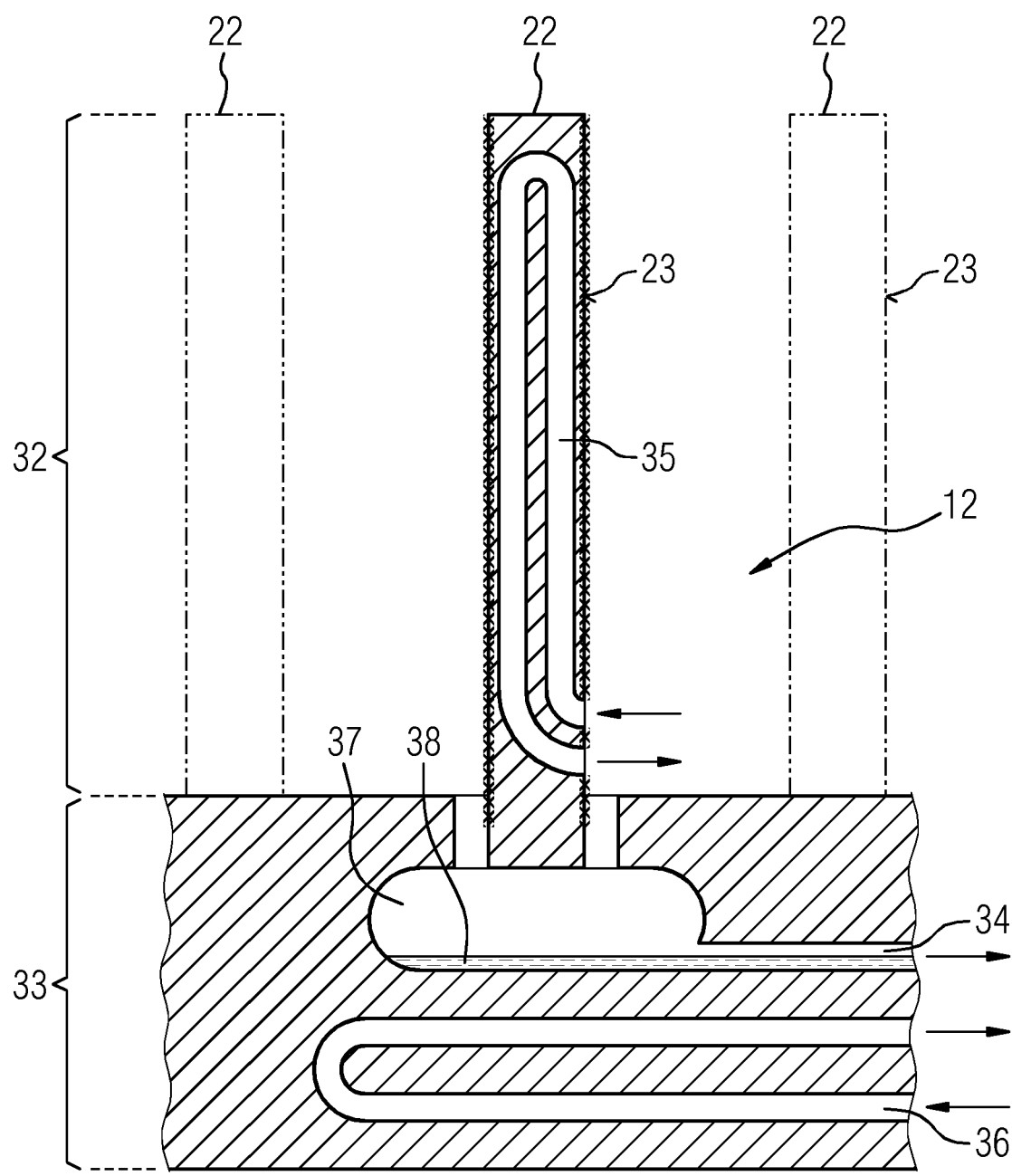
FIG. 4 shows a cross-sectional diagram of a working example of a partition which delimits the reaction duct in the pressure vessel, and which partition can be used in any of the working examples in FIGS. 1 to 3.

It can be seen in FIG. 4 that a first duct system 35 can run through the partitions 22, where a first coolant is transported through this first duct system. The partitions 22 are therefore available as condensation areas 23, on which the reaction product condenses before passing into a reservoir 37. The reservoir 37 is located in the lower region 33, where a second coolant can flow through a second duct system 36. After supercooling of the condensate 38, this can be removed through the second outlet 34.

To assist condensation, the condensation area 23 can have a porosity indicated by crosshatching in FIG. 4. This can be established via an additive production process, for example by influencing the manufacturing parameters. The porous structure can also be produced in the form of a fine grid, where the condensate can flow within the grid interstices into the reservoir 37. The grid bars and, respectively, the material of the porous structure here is available for conducting heat, and the heat can therefore be rapidly dissipated into the partition 22, where this heat is transferred to the cooling fluid flowing within the first duct system 35.

Figure 5:
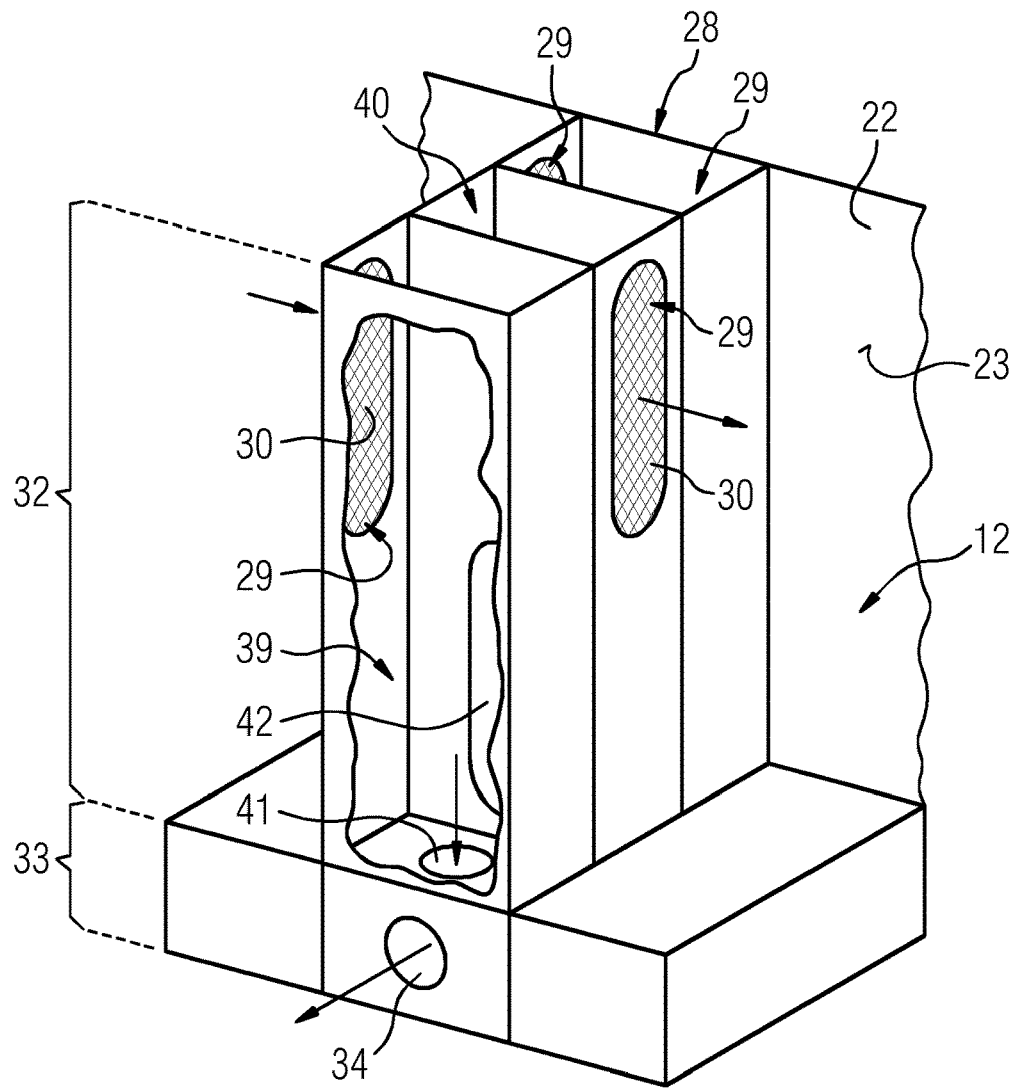
FIG. 5 shows a diagrammatic three-dimensional view of a working example of output conduits and return conduits of the type that can be used in the reaction duct in the pressure vessels in FIGS. 1 to 3.
Figure 6:
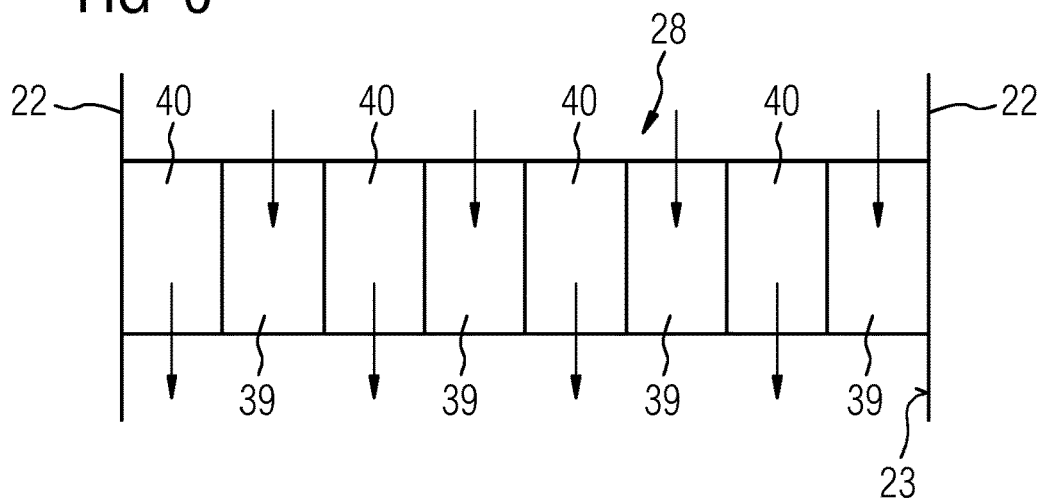
FIG. 6 shows an alternative arrangement example of output conduits and return conduits of FIG. 5.

FIG. 5 depicts in more detail the structure of the type that can be used in FIGS. 1 to 3 for a condensation trap 28. The condensation trap in FIG. 5 consists of two output conduits 39 and a return conduit 40. In FIG. 6 it can be seen that there can also be a plurality of output conduits 39 and return conduits 40 in alternation configured between the partitions 22 of the reaction duct.

In the upper region, the output conduits 39 comprise the passage for the reaction fluid. The reaction fluid is therefore conducted downward in the output ducts, while it is cooled by way of the partitions 22 and the return conduits 40. Condensate arises during the above and can flow through an aperture 41 in the base into the lower region 33. A reservoir 37, not depicted in any greater detail (cf. FIG. 4), can be available there to accept the condensate and to be cooled via a second duct system 36, likewise not depicted (cf. FIG. 4).

The remaining reaction fluid passes through a further aperture 42 into the return conduit 40, and there again flows upward to the passage 29 which is arranged in the return conduit and through which the reaction fluid again passes into the reaction space 12. Because the reaction fluid conducted through the return conduit 40 is cooler than the reaction fluid conducted through the output system, a counterflow cooler is realized via the structure of the condensation trap, so that cooling of the reaction fluid can take place in order to condense the reaction product and this can be reheated before entering the reaction space 12.

What is claimed is:

1. A reactor for carrying out a chemical equilibrium reaction between two gaseous starting materials and a gaseous product, comprising:
    a pressure vessel including a reaction space with an inlet for the two starting materials and a first outlet for the gaseous product;
    a catalytic material arranged in the reaction space;
    a condensation area in the reaction space for the gaseous product; and
    a cooling duct structure cooling the condensation area;
    wherein the cooling duct structure and the housing of the pressure vessel are constructed in a single piece;
    wherein the reaction space includes a reaction duct forcing materials flowing therein to run in a convoluted or helical manner multiple times around a central axis of the pressure vessel; and
    wherein a cross section of the reaction duct extends between opposite face sides of the pressure vessel.

2. The reactor as claimed in claim 1, further comprising flow obstacles in the reaction duct which, in alternating manner, project from one face side and from the other face side of the pressure vessel into the reaction duct.

3. The reactor as claimed in claim 1, wherein the cooling duct structure runs within the partitions.

4. The reactor as claimed in claim 1, wherein the condensation area is porous.

5. The reactor as claimed in claim 1, wherein the cooling duct structure comprises:
    a first duct system; and
    a second duct system fluidically independent of said first duct system.

6. The reactor as claimed in claim 1, wherein one of the face sides of the pressure vessel comprises a lid.

7. The reactor as claimed in claim 1, further comprising a bed of catalytic particles filling the reaction space.

8. The reactor as claimed in claim 1, further comprising a preheating duct for the starting materials, the preheating duct running within an external wall structure of the pressure vessel.

9. The reactor as claimed in claim 8, wherein the preheating duct runs in a serpentine manner within the external wall structure.

10. The reactor as claimed in claim 8, wherein the preheating duct runs in a plurality of mutually superposed layers within the external wall structure.

11. The reactor as claimed in claim 8, wherein the preheating duct runs in respectively mutually intersecting directions in adjacent layers.

12. The reactor as claimed in claim 5, further comprising a higher-situated region with the reaction space and a lower-situated region;
  wherein the second duct system runs through the lower-situated region.

13. The reactor as claimed in claim 12, wherein:
  the reaction space comprises an output conduit leading into the lower-situated region and, connected to said conduit, a return conduit leading into the reaction space; and
  the output conduit and the return conduit are connected to a second outlet.

14. The reactor as claimed in claim 13, further comprising a sieve structure separating the reaction space from the output conduit and/or from the at least one return conduit.

15. The reactor as claimed in claim 13, wherein the output conduit runs along two adjacent partitions, and between the two output conduits the return conduit runs or a plurality of output conduits and input conduits run in alternation.

* * * * *